United States Patent [19]

Edwards

[11] Patent Number: 5,181,681
[45] Date of Patent: Jan. 26, 1993

[54] ADJUSTABLE STAND APPARATUS

[76] Inventor: Johnny W. Edwards, 11319 E. 13th St., Independence, Mo. 64052

[21] Appl. No.: 653,955

[22] Filed: Feb. 12, 1991

[51] Int. Cl.⁵ .............................................. A47G 29/00
[52] U.S. Cl. ................................... 248/125; 108/106; 108/144; 403/108; 403/113
[58] Field of Search ................... 108/49, 96, 144, 106, 108/146; 403/113, 116, 108, 59; 248/121, 125

[56] References Cited

U.S. PATENT DOCUMENTS

| | | | |
|---|---|---|---|
| 683,439 | 10/1901 | Cogger | 403/116 |
| 1,797,847 | 3/1931 | Vandagriff | 108/49 |
| 2,805,778 | 9/1957 | Yordi . | |
| 2,992,684 | 1/1960 | Miller et al. . | |
| 3,015,530 | 1/1962 | Anderson . | |
| 3,026,159 | 3/1962 | Miller et al. . | |
| 3,186,673 | 6/1965 | Olson . | |
| 3,204,776 | 9/1965 | Brown et al. . | |
| 3,616,469 | 11/1971 | Ingeski | 403/116 X |
| 3,813,714 | 6/1974 | Sater | 108/49 |
| 3,868,016 | 2/1975 | Szpur et al. | 211/DIG. 1 X |
| 4,488,497 | 5/1982 | Bevans | 108/144 |
| 4,738,316 | 4/1988 | Wood | 403/108 XD |
| 4,742,980 | 5/1988 | Heigl | 248/125 |
| 4,826,059 | 5/1989 | Bosch et al. | 211/DIG. 1 X |

FOREIGN PATENT DOCUMENTS

| | | | |
|---|---|---|---|
| 219790 | 7/1961 | Austria | 108/144 |
| 696753 | 10/1964 | Canada | 108/49 |

Primary Examiner—David L. Talbott
Attorney, Agent, or Firm—Litman, McMahon & Brown

[57] ABSTRACT

An adjustable stand apparatus includes a platform for holding tools and parts for a user. The platform includes a resilient magnetic pad to maintain such tools and parts, particularly those containing ferrous materials, in a relatively fixed location until used. The platform is adjustable vertically, horizontally, and angularly to maximize user accessibility to such tools and parts. The apparatus is mounted on a mobile base, affixed to the side of an existing tool cabinet, or the like.

4 Claims, 3 Drawing Sheets

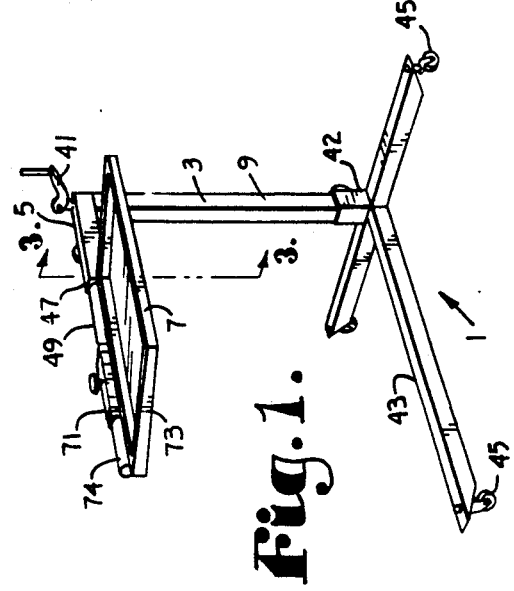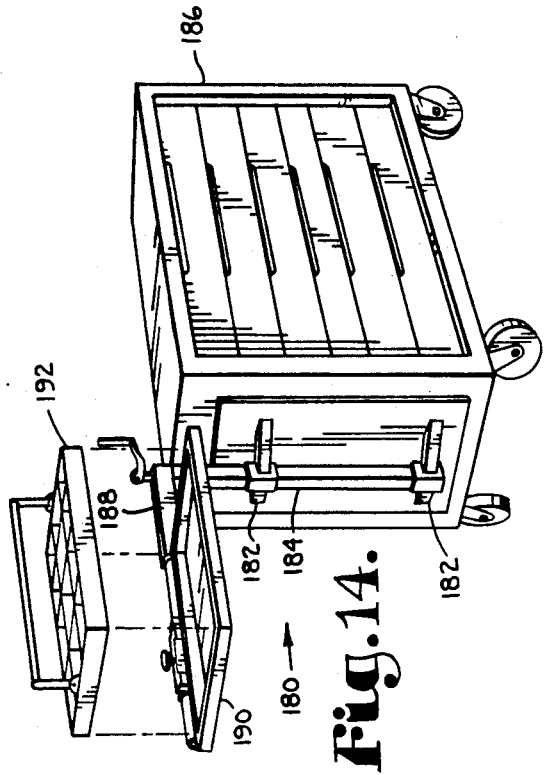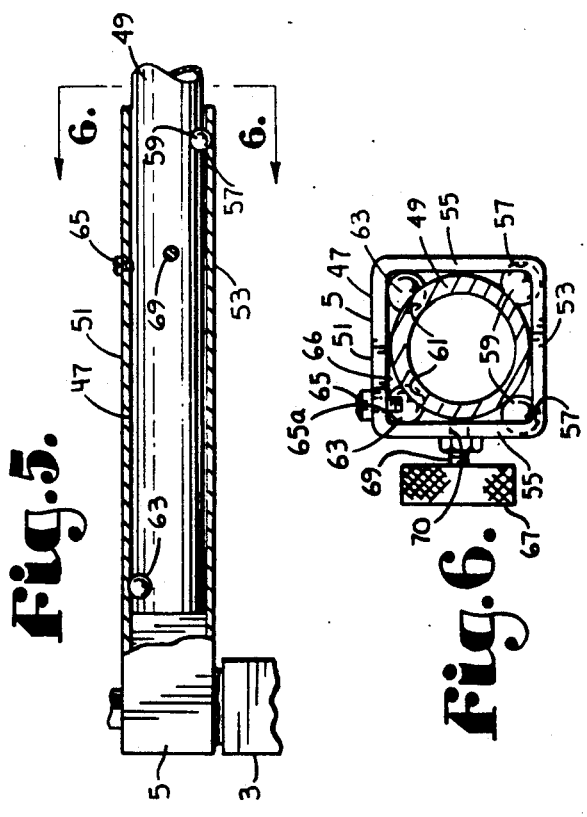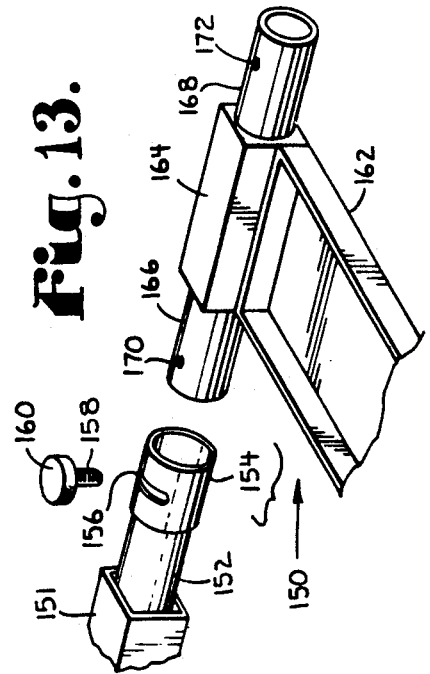

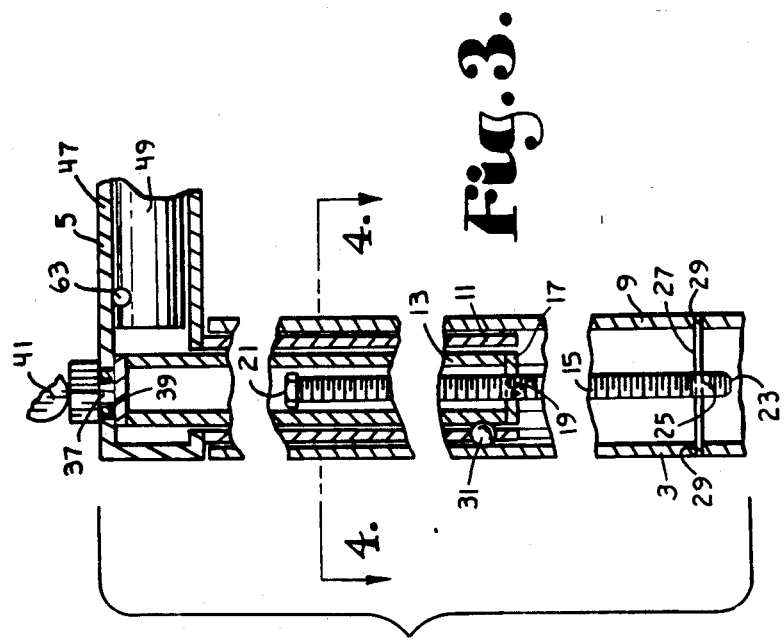

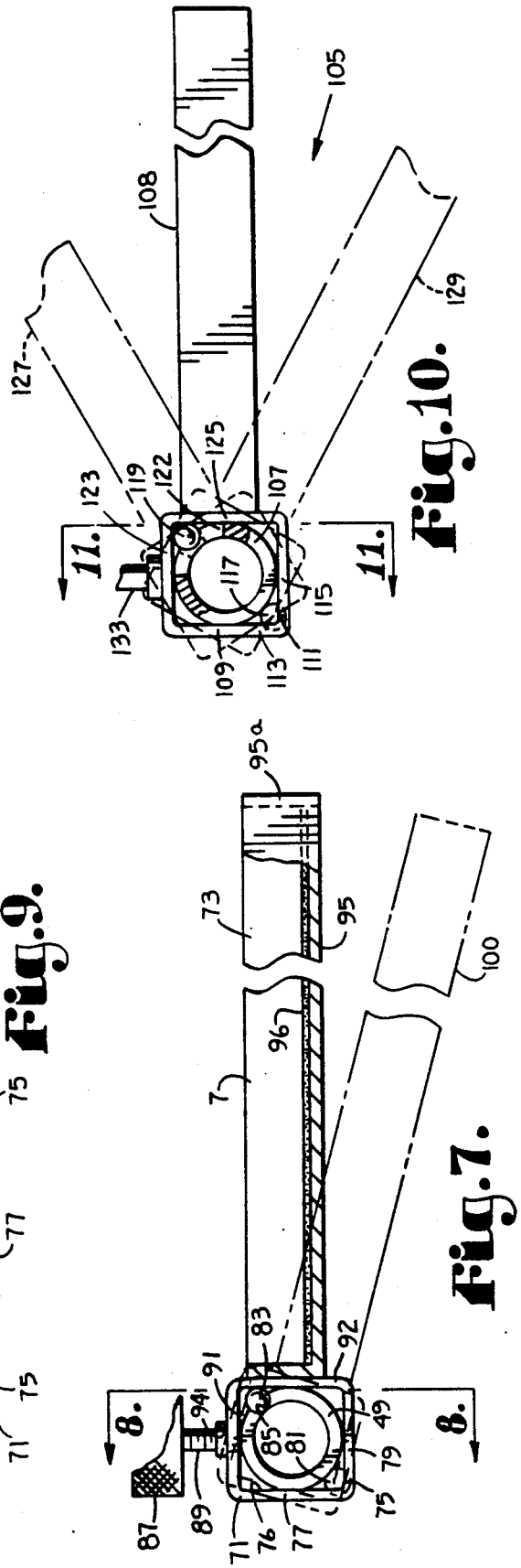

ADJUSTABLE STAND APPARATUS

BACKGROUND OF THE INVENTION

The present invention relates to an adjustable stand apparatus for holding a variety of tools and parts and, particularly, to an adjustable stand having magic holding capabilities for use by a mechanic for under-hood maintenance and repairs.

During the procedure of repairing and maintaining various types of apparatus, it is not unusual for the person performing such tasks to become disposed whereby he or she has limited physical movement or limited visual and physical access to the tools and parts essential for completing the tasks at hand. It can be extremely frustrating and time consuming if needed tools or parts have moved or fallen such that the repair person has to temporarily surrender whatever vantage he or she may have acquired to retrieve the tool or part which he or she could not grasp while blindly groping for it.

Since a substantial portion of the parts and tools used in various industries today are constructed of ferrous materials, what is needed is an apparatus for disposing tools and parts such that they are readily accessible to a user whose maneuverability is sometimes severely limited and to temporarily maintain those tools and parts in a relatively fixed position, such as by magnetic means.

SUMMARY OF THE INVENTION

An adjustable stand apparatus is provided to position tools and parts on a platform such that they are readily available to a user. The apparatus includes an elevating mechanism for adjusting the platform vertically, an extending mechanism for adjusting the platform horizontally, and a tilting mechanism for rotational adjustment of the platform about a horizontal axis.

The elevating mechanism includes an outer, rectangularly shaped leg sleeve axially cooperating with a cylindrically shaped alignment sleeve such that a sphere nested in a depression of the alignment sleeve prevents rotation of the leg outer sleeve relative to the alignment sleeve. If revolving of the platform about the common axis of the leg outer sleeve and the alignment sleeve is desired, removal of such sphere permits Such relative rotation.

A leg inner sleeve in cooperation with a threaded rod provides vertical adjustment of the platform by rotating the leg inner sleeve with a crank.

The horizontally extending mechanism includes an outer, rectangularly shaped arm sleeve axially cooperating with an inner, cylindrically shaped arm sleeve. A first pair of spheres nested in a pair of depressions formed in the arm outer sleeve provides ease of movement of the arm inner sleeve relative to the arm outer sleeve. A second pair of spheres nested in a pair of depressions formed in the arm inner sleeve prevents rotation of the arm inner sleeve relative to the arm outer sleeve. The first pair of spheres and the second pair of spheres are retained in their respective depressions by the close proximity of the cooperating arm outer sleeve and arm inner sleeve such that the arm inner sleeve is cantilevered for mounting a platform thereon.

The platform mounted on the arm inner sleeve includes a rectangularly shaped, platform sleeve telescoped over the cantilevered, distal end of the arm inner sleeve with a tray extending transversely therefrom. A pair of platform glide spheres nested in a pair of depressions formed in the platform sleeve provides ease of movement of the platform sleeve relative to the arm inner sleeve. A tilt limiting sphere nested in a depression in the arm inner sleeve permits limited tilting or angular displacement of the tray relative to the arm inner sleeve.

The tray includes a resilient, permanently magnetized pad for temporarily maintaining tools and parts placed in the tray, particularly those constructed of ferrous materials, in a relatively fixed location until used by a user.

A first modified embodiment of the present invention provides a tilt limiting sphere nested in a slot in a platform sleeve which permits a larger range of tilt angles of a tray. A plurality of slots is provided such that a plurality of tilt ranges are selectively obtainable.

A second modified embodiment of the present invention provides a hub secured to a distal end of an arm inner sleeve for receiving a first end of a platform extension arm for extending a tray transversely toward one side of the invention or for receiving a second end of the platform extension arm for extending the tray transversely toward the other side of the invention. A slot in the hub provides an ability to adjust angular displacement of the tray relative to the hub.

A third modified embodiment of the present invention provides a pair of brackets for securing a vertically oriented leg of the invention to an existing mobile tool cabinet.

OBJECTS AND ADVANTAGES OF THE INVENTION

Therefore, the objects of the present invention are: to provide an apparatus for holding tools and parts on a platform for access by a user; to provide such an apparatus with a platform which is adjustable vertically; to provide such an apparatus with a platform which is adjustable horizontally; to provide such an apparatus with a platform which is angularly adjustable about a horizontal axis; to provide such an apparatus with an ability to magnetically maintain items, particularly those containing or constructed of ferrous materials, in a relatively fixed location until used by a user; to provide such an apparatus which can be secured to existing equipment; and to generally provide such an apparatus which is relatively easy to use, simple to maintain, easy to operate efficiently and reliably, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an adjustable stand apparatus in accordance with the present invention.

FIG. 2 is an enlarged, side-elevational view of the adjustable stand apparatus showing a platform in a non-extended and unelevated configuration in solid lines and showing the platform in both an extended configuration and an elevated configuration in phantom lines.

FIG. 3 is an enlarged and fragmentary vertical cross-sectional view of a leg of the adjustable stand apparatus, taken along line 3—3 of FIG. 1.

FIG. 4 is a horizontal cross-sectional view of the leg of the adjustable stand apparatus, taken along line 4—4 of FIG. 3.

FIG. 5 is an enlarged and fragmentary side view of an arm of the adjustable stand apparatus, with portions cut away to reveal details thereof.

FIG. 6 is an enlarged cross-sectional view of the arm of the adjustable stand apparatus, taken along line 6—6 of FIG. 5.

FIG. 7 is a fragmentary vertical cross-sectional view of a platform and an inner sleeve of the arm of the adjustable stand apparatus, taken along line 7—7 of FIG. 2.

FIG. 8 is a fragmentary vertical cross-sectional view of the inner sleeve of the arm of the adjustable stand apparatus, taken along line 8—8 of FIG. 7.

FIG. 9 is a fragmentary horizontal cross-sectional view of the inner sleeve of the arm of the adjustable stand apparatus, taken along line 9—9 of FIG. 8.

FIG. 10 a fragmentary vertical cross-sectional view of a platform and an inner sleeve of an arm of a first modified embodiment of an adjustable stand apparatus similar to the view shown in FIG. 7, in accordance with the present invention.

FIG. 11 is a fragmentary vertical cross-sectional view of the inner sleeve of the arm of the first modified embodiment of the adjustable stand apparatus, taken along line 11—11 of FIG. 10.

FIG. 12 is a fragmentary horizontal cross-sectional view of the inner sleeve of the arm of the first modified embodiment of the adjustable stand apparatus, taken along line 12—12 of FIG. 11.

FIG. 13 is a fragmentary perspective view of a second modified embodiment of an adjustable stand apparatus in accordance with the present invention.

FIG. 14 is a perspective view of a third modified embodiment of an adjustable stand apparatus in accordance with the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to an adjustable stand apparatus in accordance with the present invention, as shown in FIGS. 1 through 9. The apparatus 1 generally comprises frame means, such as a leg 3 and an arm 5, and a platform 7.

The leg 3 includes a rectangularly shaped outer sleeve 9 and elevation means, such as a cylindrically shaped alignment sleeve 11 in conjunction with an inner sleeve 13 and a threaded rod 15. The alignment sleeve 11 is dimensioned such that it is slidably insertable longitudinally within the outer sleeve 9, as shown in FIG. 3. An upper end of the alignment sleeve 11 is rigidly secured substantially perpendicularly to the arm 5.

The inner sleeve 13 is dimensioned such that it is axially rotatable within the alignment sleeve 11. The inner sleeve 13 has a closed lower end 17 having a tapped throughbore 19.

The threaded rod 15 is adapted for threaded displacement through and relative to the bore 19. The threaded rod 15 has an enlarged upper or stop end 21 which is configured such that the stop end 21 cannot be threadably advanced through the bore 19. The threaded rod 15 has a lower end 23 with a diametrical throughbore 25. A pin 27 is inserted through the bore 25 and a cooperating pair of bores 29 in the leg outer sleeve 9 such that the rotational displacement of the threaded rod 15 is fixed relative to that of the leg outer sleeve 9.

Anti-rotation means, such as a leg sphere 31 nested in a spherical depression 33 formed in the alignment sleeve 11, is provided to substantially prevent rotation of the arm 5 relative to the leg 3. The leg sphere 31 is operably retained in the depression 33 by an adjoining pair of sidewalls 35 of the leg outer sleeve 9 in close proximity to the depression 33.

A stud 37, rigidly secured to an upper end of the inner sleeve 13, is dimensioned for rotational securement through a bore 39 of the arm 5 and is rigidly secured to a crank 41.

A lower end of the leg outer sleeve 9 is adapted for detachable securement to a vertically oriented receiver 42 of a base 43. The base 43 is configured to provide stable, substantially vertical orientation of the leg 3, such as a T-shaped configuration as shown in FIGS. 1 and 2. A plurality of casters 45 provide mobility for the apparatus 1.

The arm 5 includes a rectangularly shaped outer sleeve 47 and extension means, such as a cylindrically shaped inner sleeve 49. The inner sleeve 49 is dimensioned such that it is slidably insertable longitudinally within the outer sleeve 47, as shown in FIG. 5. The axis of the outer sleeve 47 is generally oriented substantially horizontally with a top wall 51 and a bottom wall 53 thereof oriented substantially horizontally, and a pair of sidewalls 55 oriented substantially vertically.

One of each of a first pair of spherical depressions 57 is formed in an inner surface of the arm outer sleeve 47 such that each one of a first pair of spheres 59 is nested in a different one of the depressions 57. Similarly, one of each of a second pair of spherical depressions 61 is formed in an outer surface of the arm inner sleeve 49 such that each one of a second pair of spheres 63 is nested in a different one of the depressions 61. The first pair of spheres 59 are retained in the first pair of depressions 57 and the second pair of spheres 63 are retained in the second pair of depressions 61 by the close proximity of the arm outer sleeve 47 to the arm inner sleeve 49 when the arm inner sleeve 49 is sufficiently inserted into the ar outer sleeve 47, as shown in FIG. 5.

The first pair of spheres 59 and the second pair of spheres 63 provide means whereby the arm inner sleeve 49 is longitudinally displaceable relative to the arm outer sleeve 47 while avoiding angular displacement of the arm inner sleeve 49 relative to the arm outer sleeve 47, as illustrated by the arrow designated by the numeral 64 in FIG. 2.

A stop pin 65 is threadably secured in a bore 65a through the arm outer sleeve 47 such that a distal end of the pin 65 protrudes into a cavity 66 and limits relative movement of the arm inner sleeve 49 by preventing the movement of one of the second pair of spheres 63 therepast.

A knurled knob 67 secured to a threaded shaft 69 cooperates with a tapped bore 70 in one of the sidewalls 55 to provide releasable securement of the arm inner sleeve 49 relative to the arm outer sleeve 47.

The platform 7 includes a platform sleeve 71 and a tray 73. The platform sleeve 71 is substantially rectangularly shaped and is dimensioned such that it is telescopable over a distal end 74 of the arm inner sleeve 49.

One of each of a pair of spherical glide depressions 75 is formed in an inner surface 76 of the platform sleeve 71 at the juncture between a sidewall 77 and a bottom wall 79 of the platform sleeve 71. One of each of a pair of glide spheres 81 is nested in a different one of the glide depressions 75.

Orientation limiting means, such as a tilt limiting sphere 83 nested in a spherical tilt limiting depression 85 formed in the arm inner sleeve 49, is provided to provide limited tilting of the tray 73. Spacing of the tilt limiting sphere 83 relative to a top wall 91 and a sidewall 92 of the platform sleeve 71 is such that limited axial rotation of the platform sleeve 71 about the arm inner sleeve 49 is provided. Also, the tilt limiting depression 85 has a slightly larger radius than that of the tilt limiting sphere 83 such that the orientation of the tray 73 can be adjusted approximately 15 degrees about a horizontal axis 93 as hereinafter described.

It is foreseen that a greater or lesser quantity of spheres similar to the first pair of spheres 59, the second pair of spheres 63, the pair of glide spheres 81 and the tilt limiting sphere 83 may be utilized to meet the requirements of a particular application.

A knurled knob 87 secured to a threaded shaft 89 cooperates with a tapped bore 94 in the top wall 91 to provide releasable securement of both the longitudinal and the rotational displacements of the platform sleeve 71 relative to the arm inner sleeve 49. Longitudinal adjustment of the platform sleeve 71 relative to the arm inner sleeve 49, as illustrated by the arrows designated by the numeral 94a in FIGS. 8 and 9, complements the longitudinal displacement designated by the numeral 64 in FIG. 2.

The tray 73 has a bottom wall 95 and sidewalls 95a rigidly secured thereto. A pad 96, constructed of resilient permanently magnetized material, is dimensioned to substantially cover the inner surface of the tray bottom wall 95a. The tray 73 is generally constructed of ferrous or other suitable material such that the pad 99 magnetically adheres to the tray bottom wall 95a.

In an actual application of the present invention, such as by a mechanic for performing under-hood automobile repairs, the tools and parts or other items (not shown) to be utilized therefor are generally placed in the tray 73. The crank 41 is rotated to adjust the arm 5 and the tray 73 upwardly or downwardly, as illustrated by the arrow designated by the numeral 97 and by the phantom lines designated by the numeral 98 in FIG. 2, as necessary to provide convenient access to the items in the tray 73. The tray 73 is adjusted outwardly by use of the knob 67, as illustrated by the arrow designated by the numeral 64 and by the arrow designated by the phantom lines designated by the numeral 99 in FIG. 2. If needed, additional outward adjustment of the tray is obtainable by the use of the knob 87, as indicated by the arrow designated by the numeral 94a in FIG. 8. Also, the amount of tilt of the tray 73 is obtained by the use of the knob 87, as indicated by the phantom lines designated by the numeral 100 in FIG. 7.

A first modified adjustable stand apparatus in accordance with the present invention is shown in FIGS. 10 through 12 and is generally designated by the reference numeral 105. Many of the characteristics of the first modified adjustable stand apparatus 105 are substantially similar to those already described for the apparatus 1 and are not reiterated here in detail.

The first modified apparatus 105 includes an arm inner sleeve 107, a tray 108, and a platform sleeve 109. One of each of a pair of spherical glide depressions 111 is formed in an inner surface of the platform sleeve 109 at the juncture between a sidewall 113 and a bottom wall 115 thereof. One of each of a pair of glide spheres 117 is nested in a different one of the glide depressions 111.

Orientation limiting means, such as a tilt limiting sphere 119 nested in one of a plurality of slots 121, such as slot 122 as shown in FIGS. 10-12, is provided to limit tilting of the tray 108. The slots 121 are formed in the arm inner sleeve 107 and have an arcuate cross-section with a radius dimensioned substantially similar to that of the tilt limiting sphere 119. Each of the slots 121 is adapted to confine the tilt limiting sphere 119 to a region prescribed by a selected one of the slots 121, a top wall 123, and a sidewall 125. The range of tilt of the tray 108 is prescribed by the range of travel allowed by the tilt limiting sphere 119 while nested in a selected one of the slots 121, with an uppermost tilt as illustrated by the phantom lines designated by the numeral 127 in FIG. 10 obtained when the tilt limiting sphere 119 substantially abuts one end of the selected slot 121 and a lowermost tilt as illustrated by the phantom lines designated by the numeral 129 in FIG. 10 obtained when the tilt limiting sphere 119 substantially abuts the other end of the selected slot 121. It is to be understood that the range of tilt of the tray 108 is controlled by which one of the slots 121 is selected by placing the tilt limiting sphere 119 therein as the arm inner sleeve 107 is inserted through the platform sleeve 109.

A knurled knob 131 secured to a threaded shaft 133 cooperates with a tapped bore 135 in the top wall 123 to provide releasable securement for a selected tilt angle of the tray 108.

A second modified adjustable stand apparatus in accordance with the present invention is shown in FIG. 13 and is generally designated by the reference numeral 150. Many of the characteristics of the second modified adjustable stand apparatus 150 are substantially similar to those already described for the apparatus 1 and the apparatus 105 and are not reiterated here in detail.

An arm 151 has a cylindrically shaped ar inner sleeve 152. The arm inner sleeve 152 has a cylindrically shaped hub 154 rigidly secured to the distal end of the arm inner sleeve 152. The hub 154 has a through-slot 156 having a width dimensioned slightly greater than the diameter of a threaded shaft 158 of a knurled knob 160.

A tray 162 is rigidly secured to an arm extension 164 having a pair of opposing, cylindrically shaped hub inserts 166 and 168, as shown in FIG. 13. The inserts 166 and 168 are dimensioned such that each can be slidably inserted into the hub 154 such that the shaft 158 can be inserted through the slot 156 and threaded into a tapped throughbore 170 of the insert 166, or inserted through the slot 156 and threaded into a tapped throughbore 172 of the insert 168, depending on which one of the inserts, 166 or 168, is inserted into the hub 154.

In an actual application of the second modified adjustable stand apparatus 150, insertion of the insert 166 into the hub 154 disposes the tray 162 toward one side of the arm 151 whereas insertion of the insert 168 into the hub 154 disposed the tray 162 toward the other side of the arm 151. The length and extremities of the slot 156 prescribes the range of tilt obtainable from the tray 162.

A third modified adjustable stand apparatus in accordance with the present invention is shown in FIG. 14 and is generally designated by the reference number 180. Many of the characteristics of the third modified adjustable stand apparatus 180 are substantially similar to those already described for the apparatus 1, the apparatus 105, and the apparatus 150 and are not reiterated here in detail.

A pair of brackets 182 are adapted to rigidly secure a leg 184 to the side of an existing tool cabinet 186, as shown in FIG. 14. The brackets 182 are secured to the cabinet 186 with bolts (not shown), or other suitable means. In addition to affixation of the leg 184 to the cabinet 186, the leg 184 is dimensioned such that it can be inserted into a base (not shown), similar to the base 43 hereinbefore described.

The leg 184 is adapted to include internal structure (not shown), similar to the alignment sleeve 11 and the leg sphere 31 hereinbefore described In an actual application of the apparatus 180, the apparatus 180 can be used with such leg sphere 31 in place such that an arm 188 and a platform tray 190 are substantially fixed relative to the leg 184 or, alternatively, with such leg sphere 31 removed such that the arm 188 and the tray 190 are rotatable about the axis of the leg 184.

The apparatus 180 includes a removable partitioned tray 192 for separately holding a variety of relatively small parts. The partitioned tray 192 is dimensioned such that it can be conveniently placed in the platform tray 190.

It is to be understood that while certain forms of the present invention have been illustrated and described herein, it is not to be limited to the specific forms or arrangement of parts described and shown.

What is claimed and desired to be secured by Letters Patent is as follows:

1. An adjustable stand comprising:
 (a) a frame having a substantially vertically oriented leg connected to a substantially horizontally oriented arm wherein:
  (1) said leg has a rectangularly shaped outer sleeve and a cylindrically shaped alignment sleeve for slidable axial displacement within said leg outer sleeve; said leg further has a cylindrically shaped inner sleeve for rotational displacement within said alignment sleeve and a threaded rod for axially displacing said alignment sleeve and said leg inner sleeve relative to said leg outer sleeve; said leg further has a removable leg sphere contained in a depression formed in said alignment sleeve to prevent rotational displacement between said leg outer sleeve and said alignment sleeve;
  (2) said arm has a rectangularly shaped outer sleeve and a cylindrically shaped inner sleeve for slidable axial displacement within said arm outer sleeve; said arm further has a first pair of spheres contained in a first pair of depressions formed in an inner surface of said arm outer sleeve near the distal end thereof; said arm further has a second pair of spheres contained in a second pair of depressions formed in an outer surface of said arm inner sleeve contained within said arm outer sleeve such that rotational displacement between said arm outer sleeve and said arm inner sleeve is prevented; said first pair of spheres cooperating with said second pair of spheres such that said arm inner sleeve is cantilevered from said arm outer sleeve; said arm further has a platform depression formed in an outer surface of said arm inner sleeve near the cantilevered distal end thereof;
 (b) a platform having a rectangularly shaped platform sleeve and a tray extending transversely from said platform sleeve; said platform sleeve dimensioned to slidably and rotatably telescope over the cantilevered distal end of said arm inner sleeve; said platform sleeve having a pair of glide spheres contained in a pair of depressions formed in an inner surface of said platform sleeve; said platform sleeve having a rotation limiting sphere contained in said platform depression of said arm inner sleeve; said tray having a substantially planar bottom wall constructed of ferrous material and at least one side wall; and
 (c) a resilient pad constructed of permanently magnetized material for detachable securement to said tray bottom wall and to those of said tools and parts which contain ferrous material.

2. The adjustable stand according to claim 1 including:
 (a) a base for supporting said leg in a substantially vertical orientation.

3. The adjustable stand according to claim 1 including:
 (a) a pair of brackets for securing said leg to an existing apparatus.

4. The adjustable stand according to claim 1 wherein:
 (a) said platform depression is an elongated slot having an arcuate cross-section.

* * * * *